Figure 1:
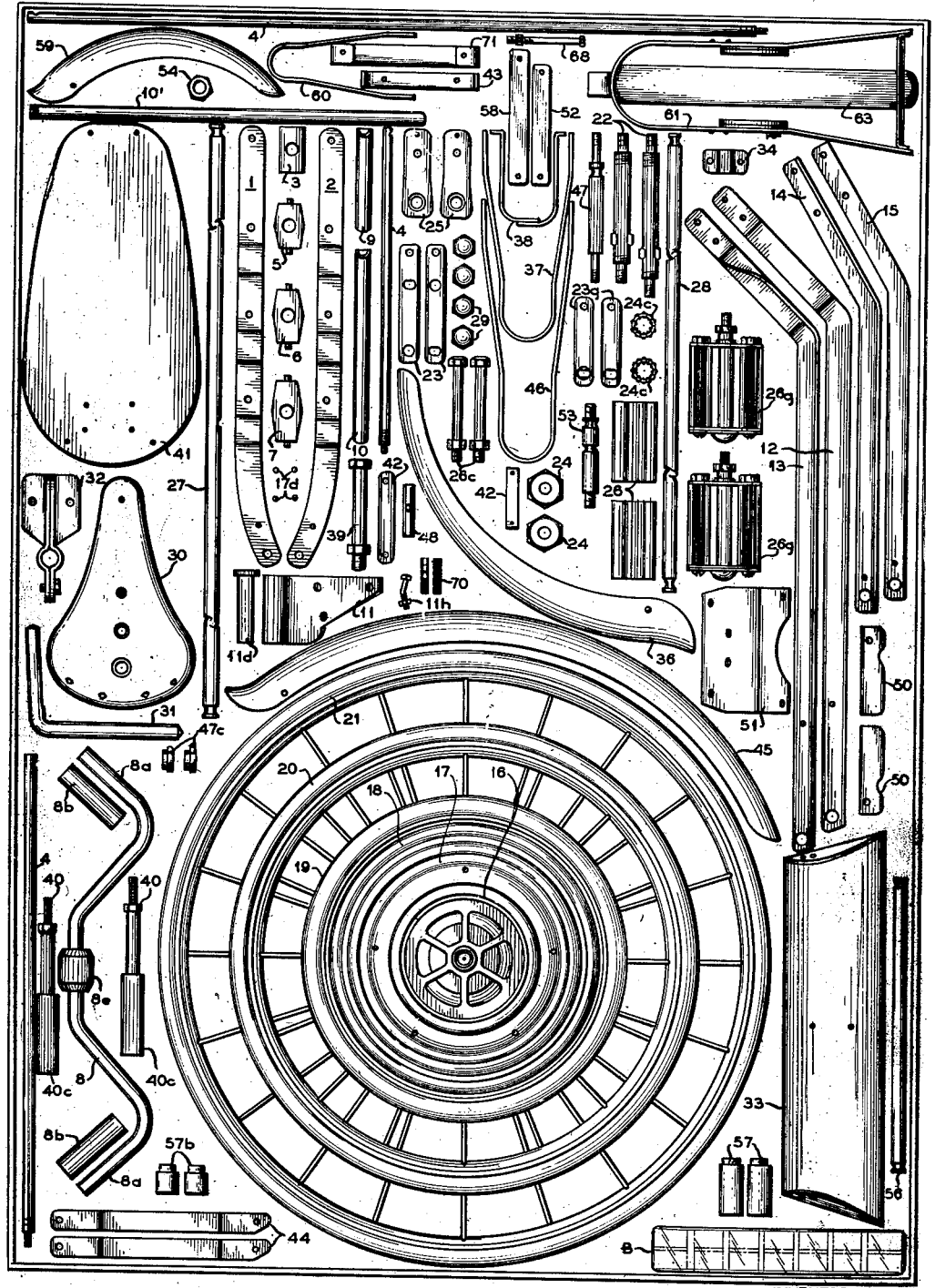

INVENTOR
ROLAND WILSON

Oct. 30, 1956  R. WILSON  2,768,834
VEHICLE CONSTRUCTION KIT
Filed Feb. 24, 1949  12 Sheets-Sheet 2

INVENTOR
ROLAND WILSON
BY
ATTORNEY

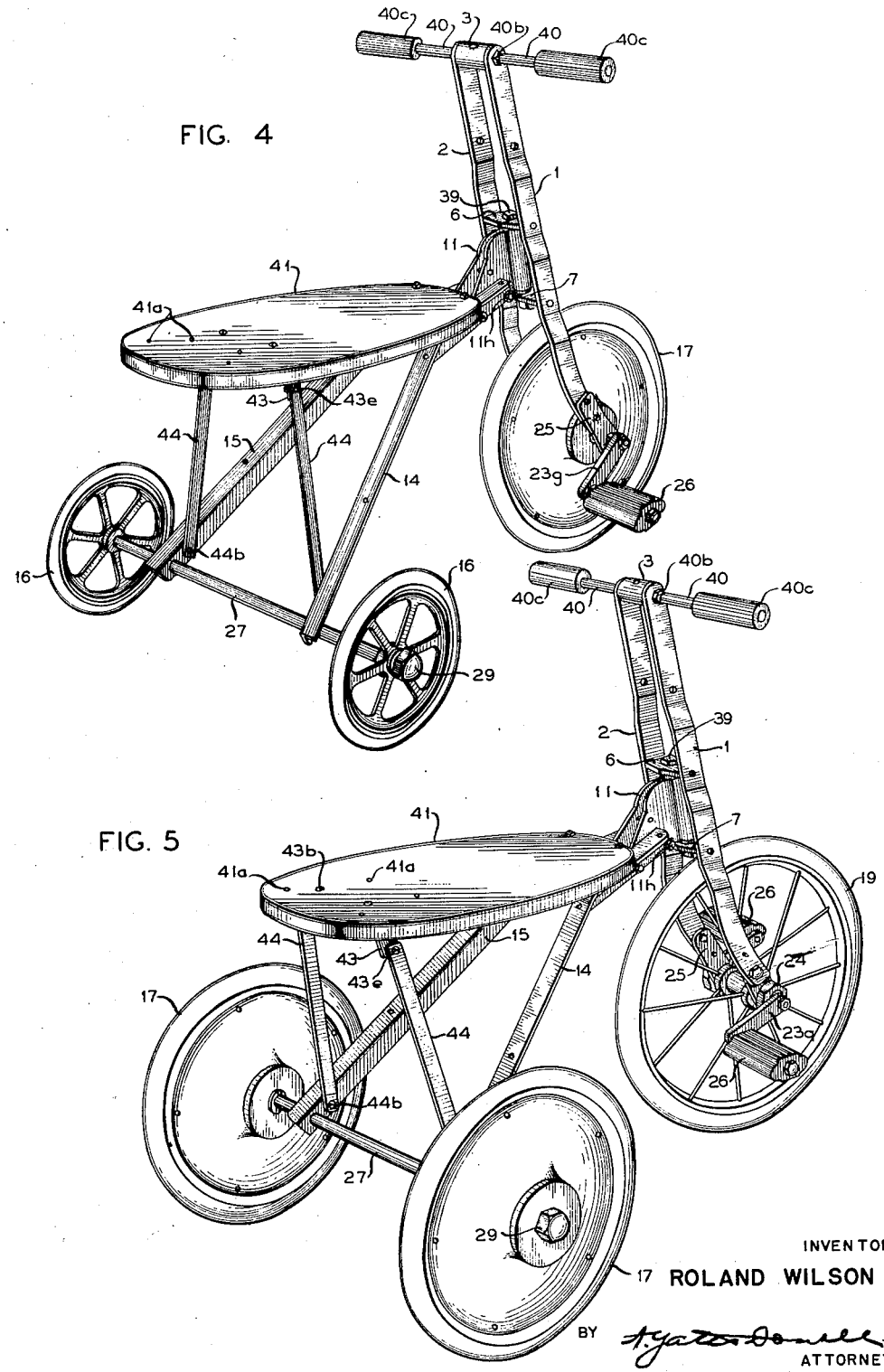

Oct. 30, 1956 R. WILSON 2,768,834
VEHICLE CONSTRUCTION KIT
Filed Feb. 24, 1949 12 Sheets-Sheet 4

INVENTOR
ROLAND WILSON
ATTORNEY

Oct. 30, 1956 R. WILSON 2,768,834
VEHICLE CONSTRUCTION KIT
Filed Feb. 24, 1949 12 Sheets-Sheet 5
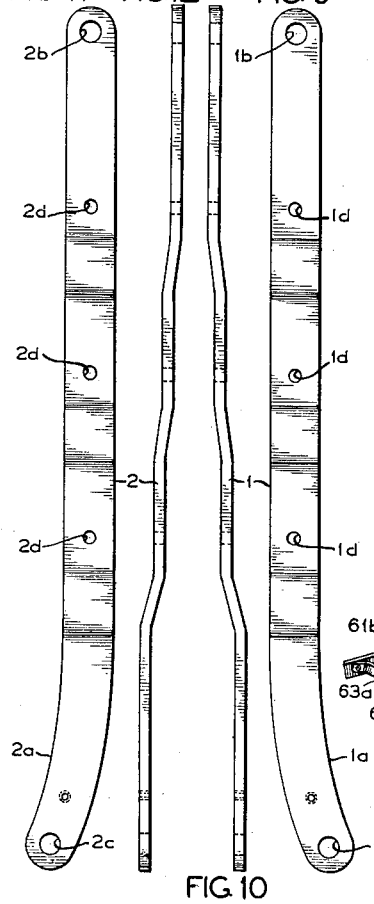
INVENTOR
ROLAND WILSON
BY
ATTORNEY

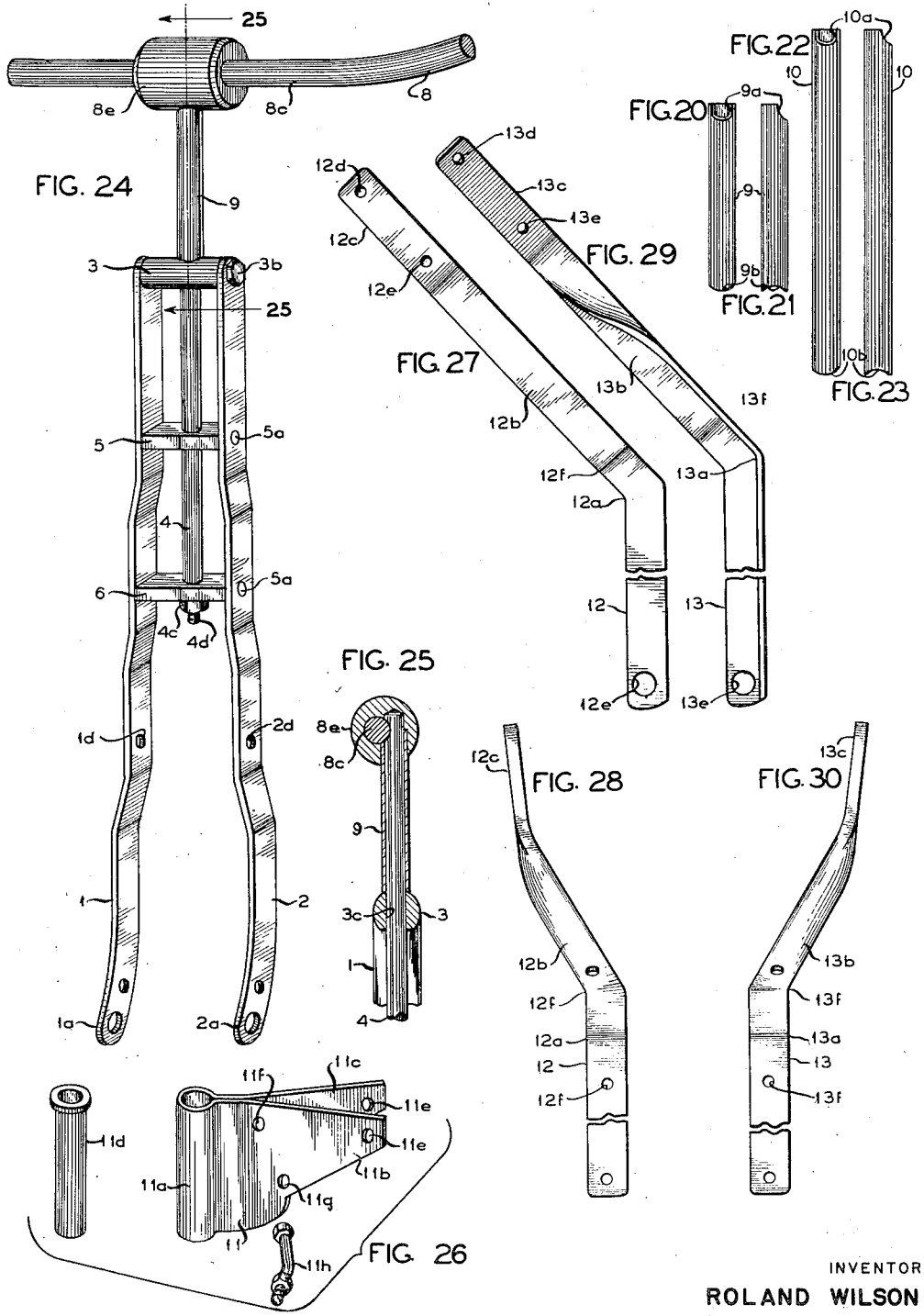

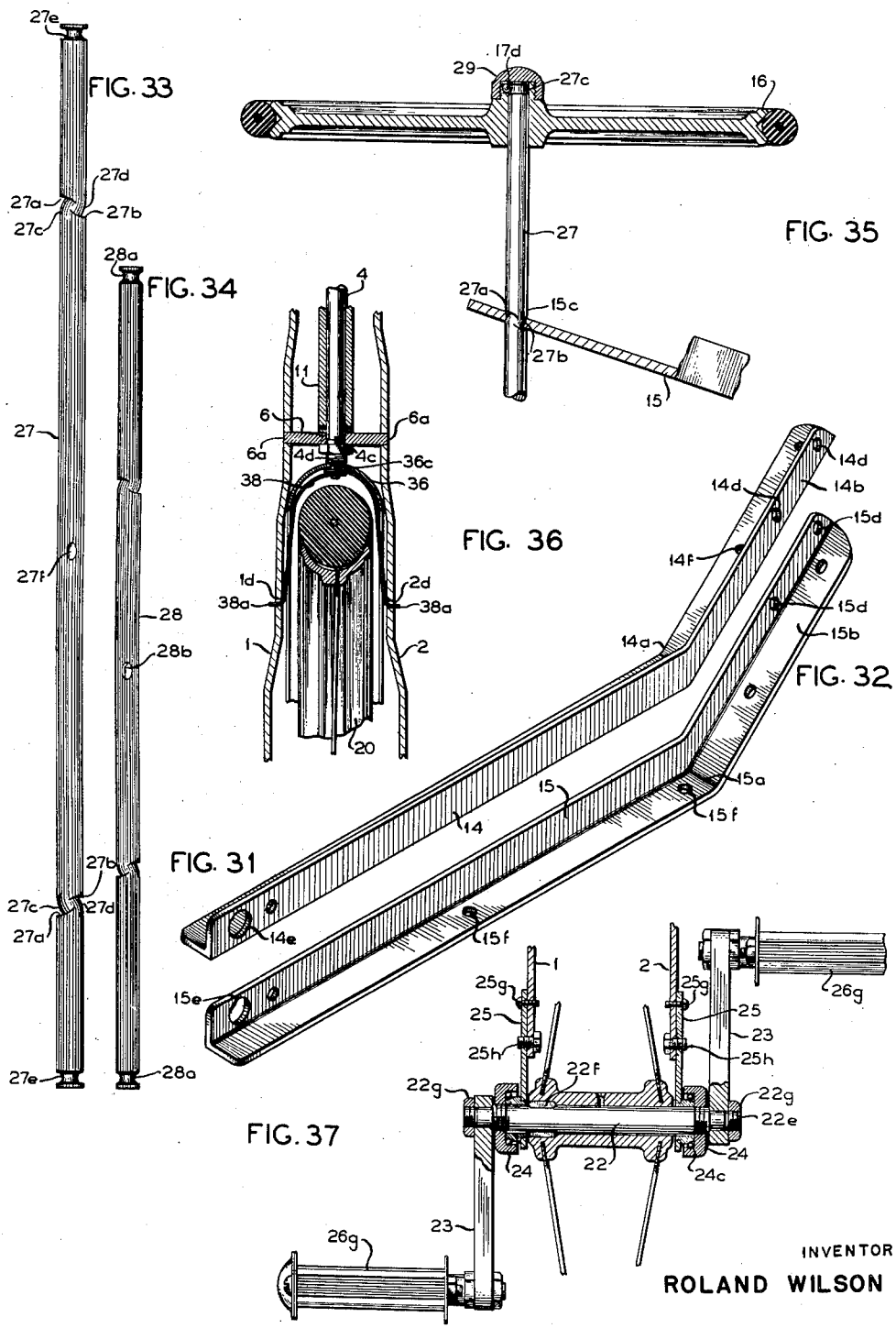

Oct. 30, 1956  R. WILSON  2,768,834
VEHICLE CONSTRUCTION KIT
Filed Feb. 24, 1949  12 Sheets-Sheet 8
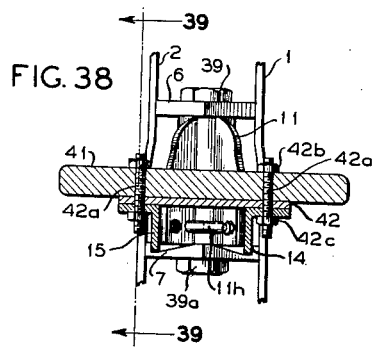
FIG. 38
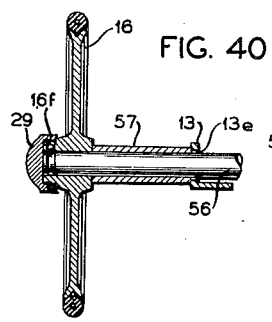
FIG. 40
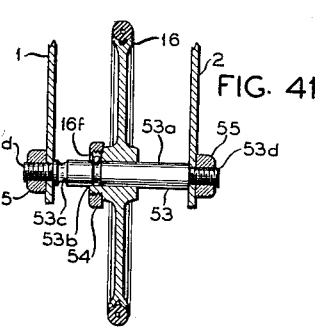
FIG. 41
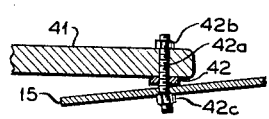
FIG. 39
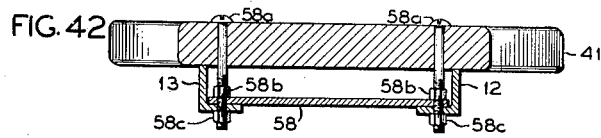
FIG. 42
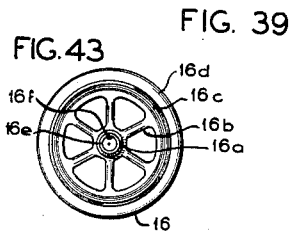
FIG. 43
FIG. 44
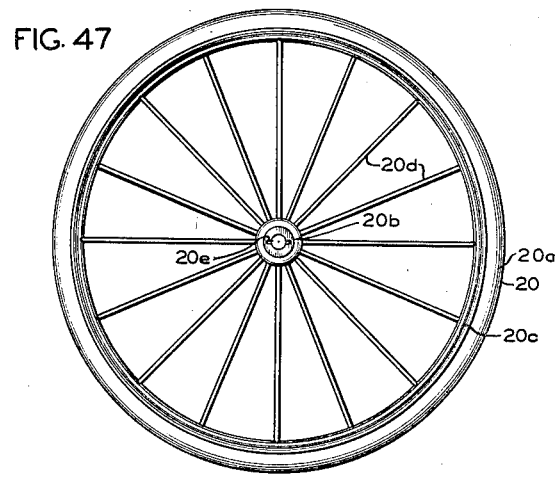
FIG. 47
FIG. 46
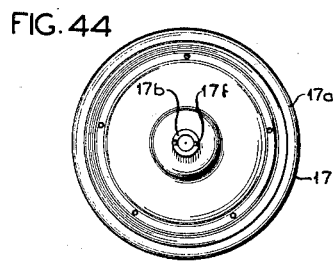
FIG. 45
INVENTOR
ROLAND WILSON
BY *Ayates Dowell*
ATTORNEY

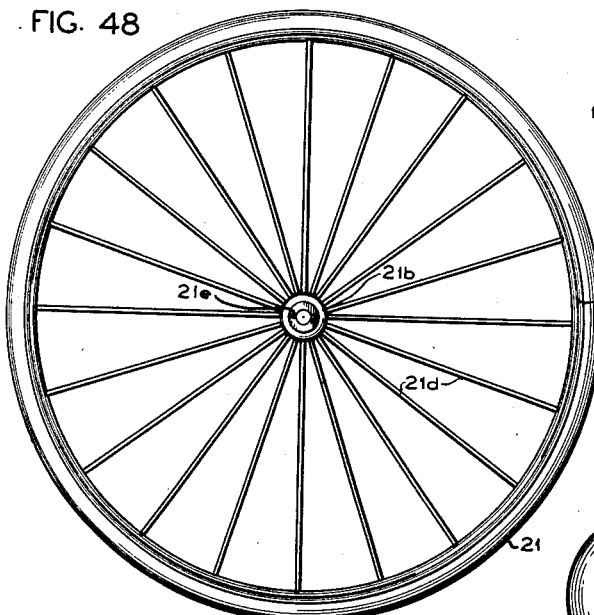
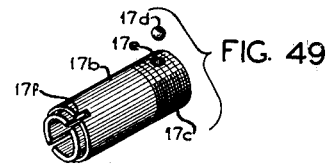
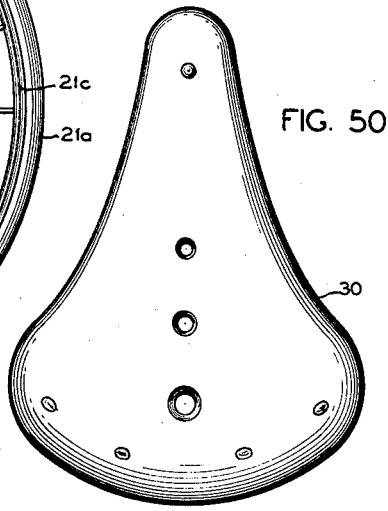
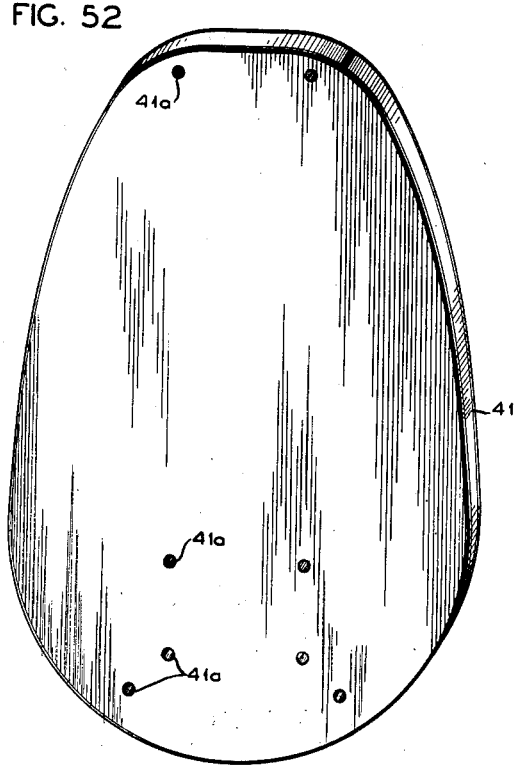
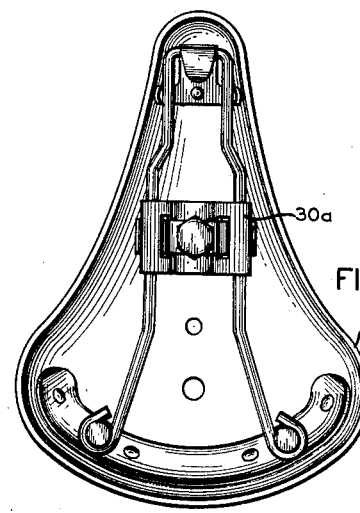

Oct. 30, 1956   R. WILSON   2,768,834
VEHICLE CONSTRUCTION KIT
Filed Feb. 24, 1949   12 Sheets-Sheet 10
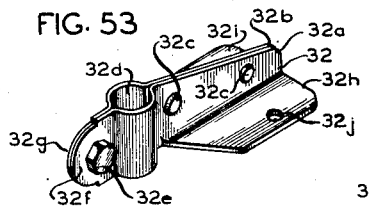
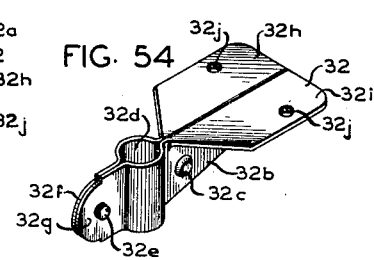
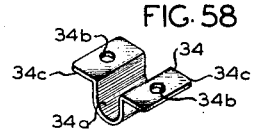
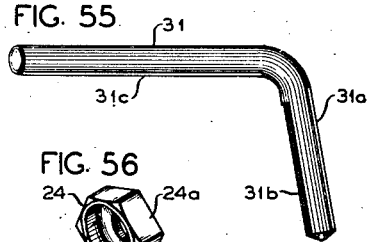
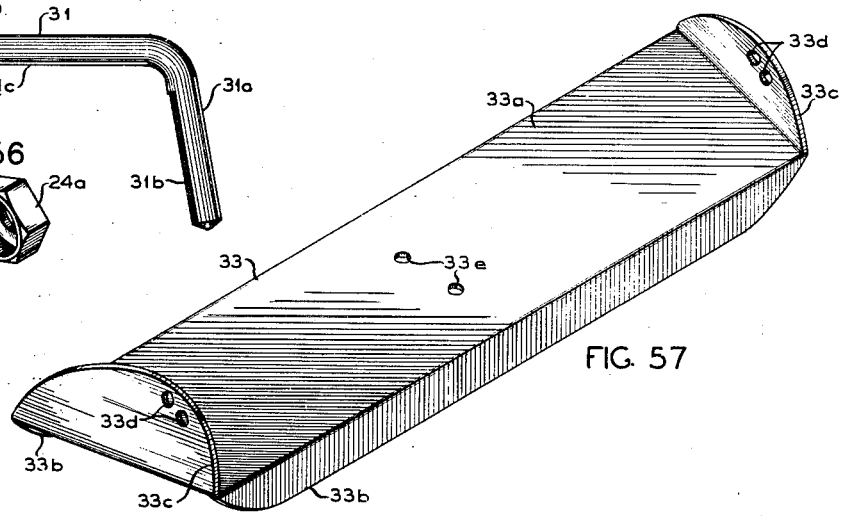
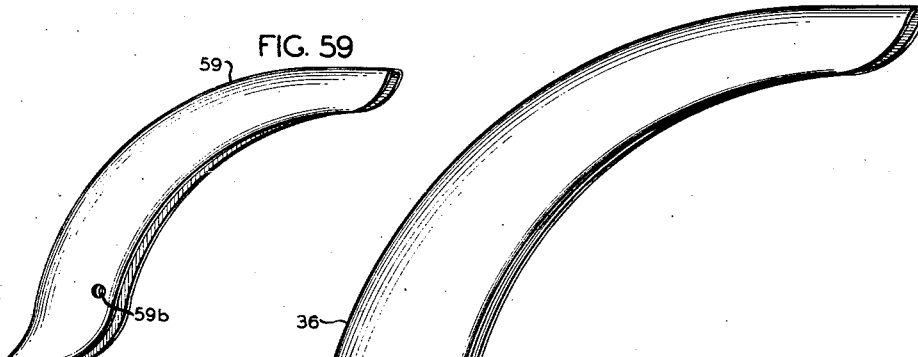
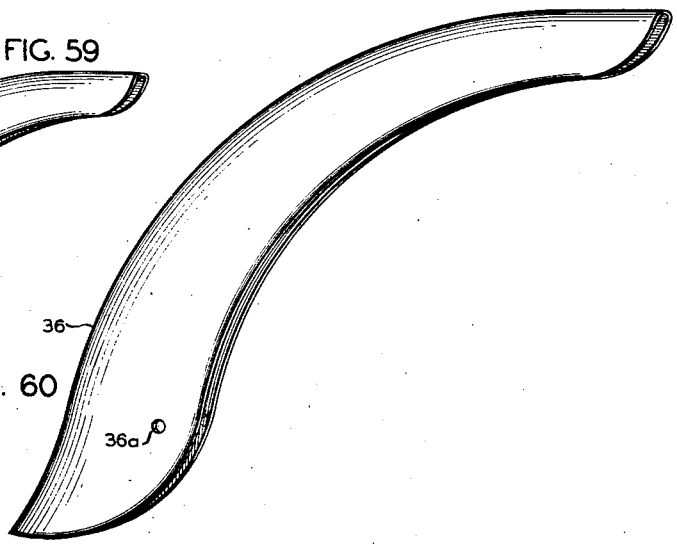
INVENTOR
ROLAND WILSON
BY
ATTORNEY Oct. 30, 1956 R. WILSON 2,768,834
VEHICLE CONSTRUCTION KIT
Filed Feb. 24, 1949 12 Sheets-Sheet 11
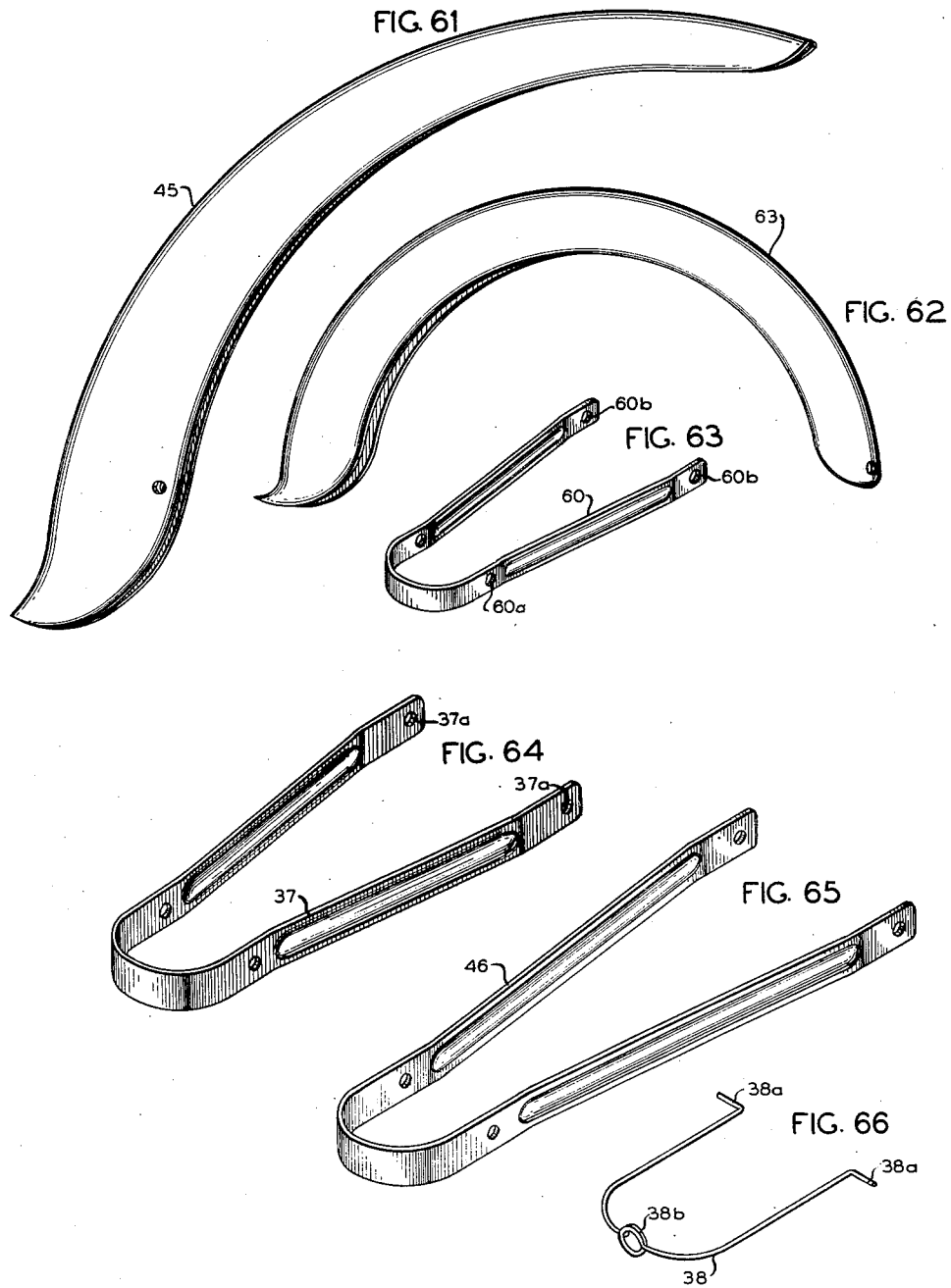
INVENTOR
ROLAND WILSON
BY *A. Yates Dowell*
ATTORNEY Oct. 30, 1956    R. WILSON    2,768,834
VEHICLE CONSTRUCTION KIT
Filed Feb. 24, 1949    12 Sheets-Sheet 12
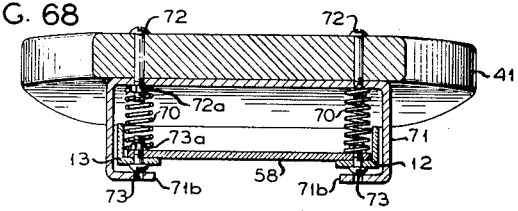
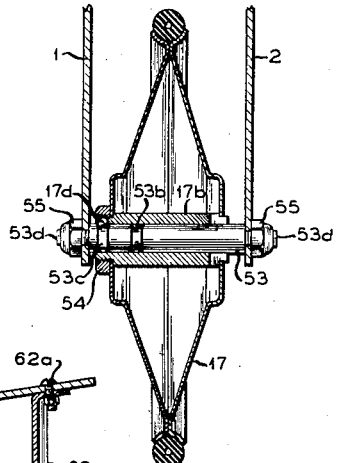
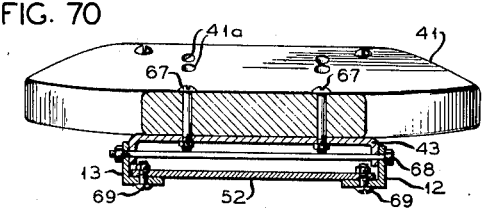
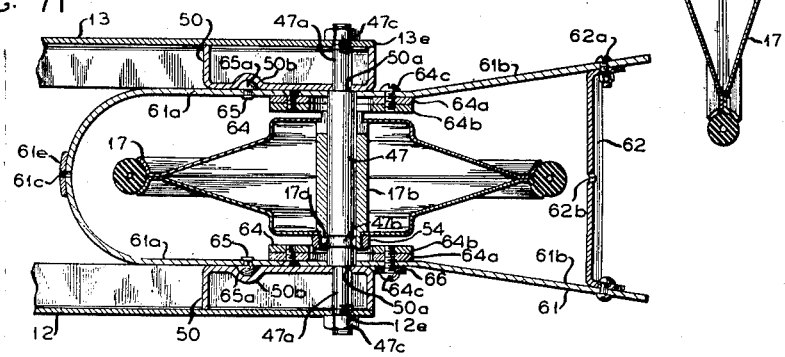
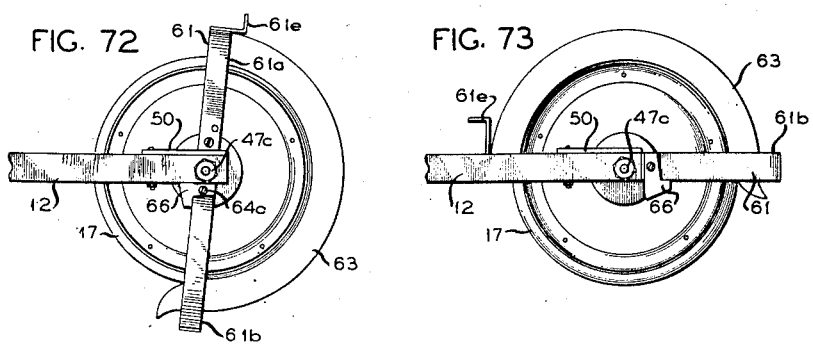
INVENTOR
ROLAND WILSON
BY *Ayatts Dowell*
ATTORNEY

United States Patent Office 2,768,834
Patented Oct. 30, 1956

2,768,834

VEHICLE CONSTRUCTION KIT

Roland Wilson, Washington, D. C.

Application February 24, 1949, Serial No. 78,080

9 Claims. (Cl. 280—7.1)

This invention relates in the main to vehicles intended for use chiefly by juveniles but in some instances by adults, and more particularly to the provision of comparatively few pre-fabricated parts of improved and simplified design intended for interchangeable assembly for the construction of a relatively wide variety of wheeled vehicles of essentially different characteristics, selectively adapted for use by children of various ages and interests.

In designing these parts a primary object has been the achievement of maximum interchangeability, due regard being given at the same time to the specific needs of each vehicle in which they are to be incorporated. Each vehicle in turn has many elements of novelty and individuality both in design and construction. Each is capable of being put together with a minimum number of parts, and each is susceptible of elaboration by the addition of other parts or accessories for the purposes of supplementing, improving or changing the vehicular design. Special care has been given to the problem of production costs, and all parts are relatively simple and inexpensive to manufacture.

Analogous devices have been produced heretofore in which there were parts common to a plurality of structures. Generally such devices have been limited to the field of toys as such, and mechanical or educational erecting sets, the provision of full-size and serviceable wheeled vehicles having received but little consideration. Accordingly, the extensive interchangeability of parts, the simplicity of construction, the ease of assembly, and the economy contemplated in the present invention, have not hitherto been achieved in this particular field. Such articles, to the extent to which they have been available, have not been provided at reasonable cost, nor has consideration been given heretofore to the provision of an extensive range of additional or supplementary parts with which to amplify or modify the assemblies contemplated.

It is, accordingly, a major object of the present invention to provide a kit of completely pre-fabricated parts of comparatively inexpensive construction from the selection of which any one or a number of wheeled vehicles may be assembled with the exercise of minimum skill and the use of only the simplest of tools. Any vehicle included in the range described herein may be completely assembled with the aid only of an adjustable wrench and a screwdriver.

While reference is made herein to "a kit" of parts the reference in the singular is not to be taken as limiting the claims to the whole or to any particular selection of the parts described herein. It will be obvious that a kit could, on the one hand, contain all of the parts described, which would permit any one of the vehicles described to be assembled therefrom; or, on the other hand, it could contain any one of a large number of different combinations of parts which would permit the assembly of one or more of the vehicles selectively chosen from the full range available.

For illustrative purposes, and to assist the exposition, one such particular selection of parts, depicted in Fig. 1, has been specially referred to herein as a "basic kit," but no limitive significance is to be attached to the word "basic." Numerous other selections could equally well be so described.

It is a still further object of the invention to provide a kit of the class set forth especially designed to permit the selective assembly of certain wheeled vehicles in at least two different sizes, the more readily to meet the differing physical requirements of small and large children, or of the same child at different stages of development or interests.

It is a further object of the invention to provide a single variety of frame member, susceptible of variation as to size, adapted for interchangeable use within different species of vehicles.

It is another object of the present invention to provide a kit of the class set forth from which the following wheeled vehicles may be selectively assembled: various sizes of scooters, tricycles, and bicycles, which utilize identical main frame members and in which the several parts are kept to a minimum in number and are designed for wide adaptability to other uses.

Figure 2:
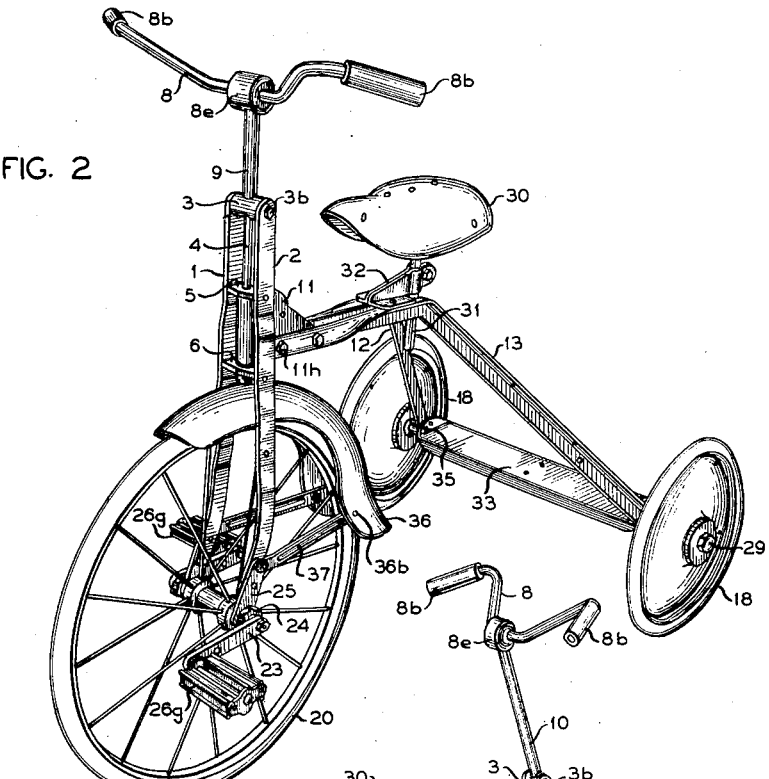
Figure 3:
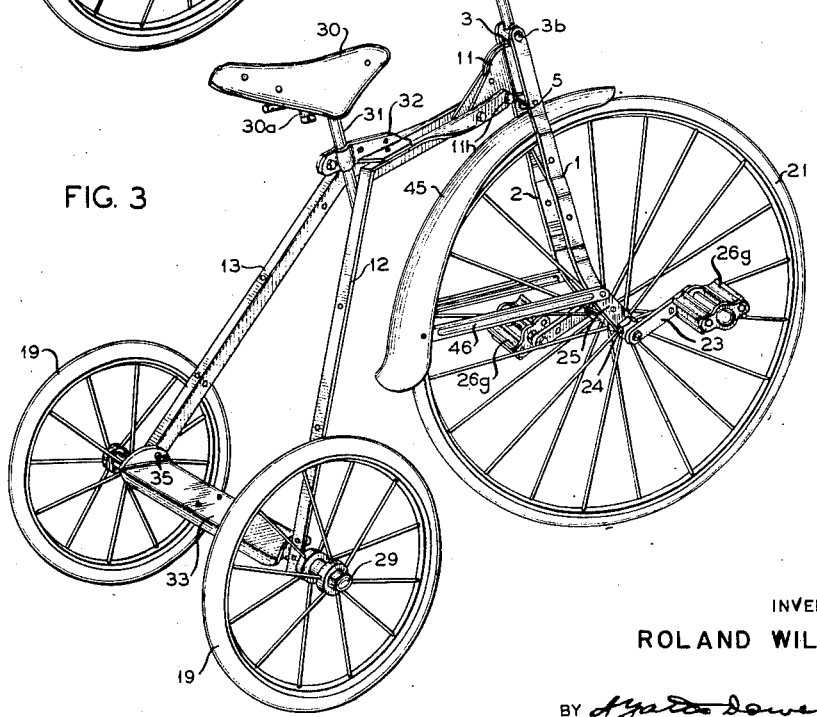
Figure 7:
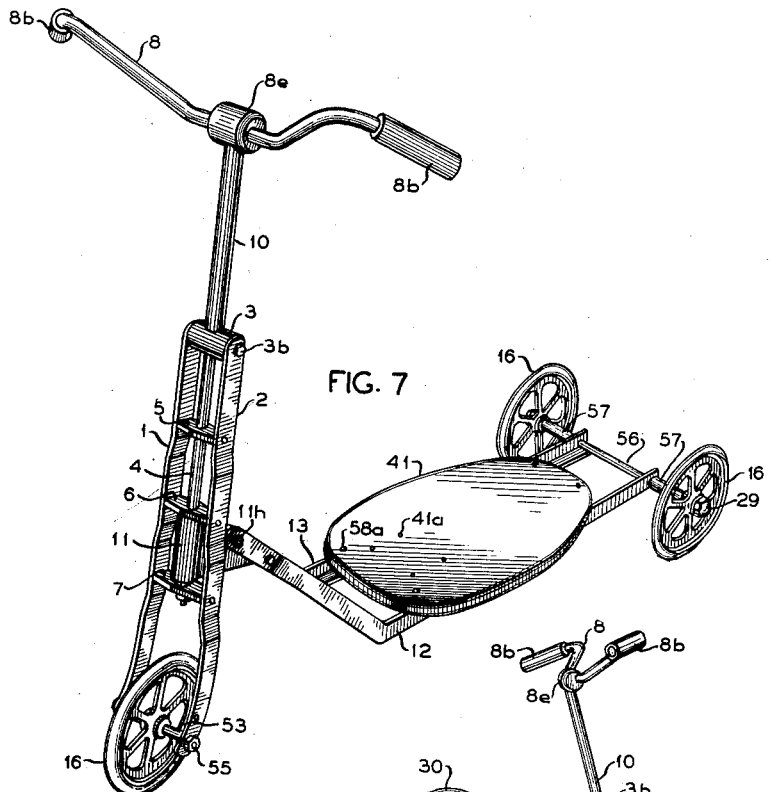
Figure 6:
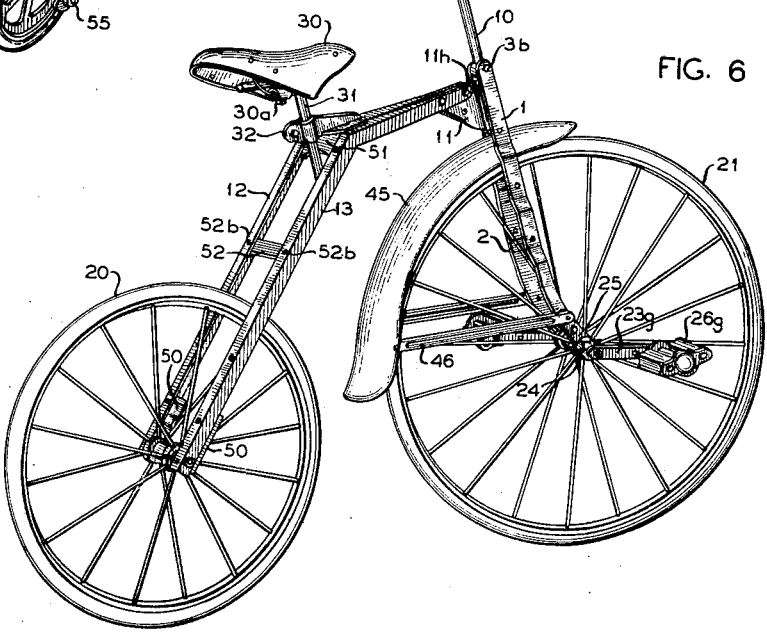

Further objects and advantages of the invention will be apparent from the following description, taken in conjunction with the accompanying drawings wherein:

Fig. 1 is a plan view of an illustrative basic kit, each part therein being separately displayed with the exception of the wheels which have been illustrated as superimposed with the smallest size uppermost;

Fig. 2, a perspective of the small tricycle;

Fig. 3, a perspective of the large tricycle;

Fig. 4, a perspective of the small kiddie car;

Fig. 5, a perspective of the large kiddie car;

Fig. 6, a perspective of the bicycle;

Fig. 7, a perspective of the small scooter;

Fig. 8, a perspective of the large scooter;

Fig. 9, an elevation of the right side member of the steering fork;

Fig. 10, an edge view of the steering fork right side member;

Fig. 11, an elevation of the steering fork left side member;

Fig. 12, an edge view of the steering fork left side member;

Fig. 13, an exploded perspective of the steering fork head and securing bolts;

Fig. 14, an elevation of the small steering fork rod;

Fig. 15, a perspective of a steering fork cross bar;

Fig. 16, a perspective of another steering fork cross bar, slightly larger than the one illustrated in Fig. 15;

Fig. 17, a perspective of still another steering fork cross bar, slightly larger than the one illustrated in Fig. 16;

Fig. 18, an exploded elevation of the handlebar and hand gripping members;

Fig. 19, a transverse sectional view, taken on the line 19—19 of Fig. 18;

Fig. 20, an elevation of the shortest spacing sleeve;

Fig. 21, a side view of the spacing sleeve illustrated in Fig. 20;

Fig. 22, an elevation of a slightly longer spacing sleeve,

Fig. 23, a side view of the spacing sleeve illustrated in Fig. 22;

Fig. 24, a perspective view of the handle bar assembly and steering fork;

Fig. 25, a sectional view on the line 25—25 of Fig. 24, showing the assembly details of the fork head, fork rod, spacing sleeve, handle bar and handle bar coupling member;

Fig. 26, an exploded perspective illustrating the swivel bracket, bracket bushing, and the chassis securing bolt;

Fig. 27, a side elevation of the chassis right side frame member;

Fig. 28, a top plan view of the chassis right side frame member;

Fig. 29, a side elevation of the chassis left side frame member;

Fig. 30, a top plan view of the chassis left side frame member;

Fig. 31, a perspective view of a smaller chassis right side frame member;

Fig. 32, a perspective view of a smaller chassis left side frame member;

Fig. 33, an elevation of an axle;

Fig. 34, an elevation of a smaller size axle;

Fig. 35, a fragmentary view partly in section showing the manner in which the chassis or frame members are secured to the rear axle and also the novel wheel attaching means;

Fig. 36, a fragmentary view partly in section showing the novel method of attaching the front fender to the fork;

Fig. 37, a fragmentary view partly in section showing the front axle, bearing and crank assembly for the small and large tricycle, the small and large kiddie car and the bicycle;

Fig. 38, a fragmentary view partly in section showing the connection between the forward end of the seat board and the frame or chassis on the small and large kiddie car;

Fig. 39, a sectional view on the line 39—39 of Fig. 38;

Fig. 40, a fragmentary view partly in section showing the rear wheel and axle mounting on the small scooter;

Fig. 41, a fragmentary view partly in section showing the front wheel and axle mounting on the small scooter;

Fig. 42, a fragmentary view partly in section showing the manner of securing the foot board to the frame or chassis on the small scooter;

Figs. 43–48, elevational views showing the six sizes of wheels supplied with the basic kit;

Fig. 49, an exploded perspective showing a hub member for the disc wheels shown in Figs. 44 and 45;

Fig. 50, a top plan view of a saddle which may be used on several of the vehicles;

Fig. 51, a bottom plan view of the saddle of Fig. 50;

Fig. 52, a perspective of the seat and foot board used on the small and large kiddie cars and the small and large scooter;

Figs. 53 and 54, perspectives showing the construction of the seat post clamp or support;

Fig. 55, a perspective of the seat post;

Fig. 56, a perspective of a nut forming the outer ball race used in connection with the crank assemblies;

Fig. 57, a perspective showing the rear step used on the small and large tricycle;

Fig. 58, a perspective showing the clip for securing the rear step of Fig. 57 to the rear axle;

Figs. 59–62, perspectives showing the various sizes of fenders used on the small and large tricycle, the bicycle and the large scooter;

Figs. 63–65, perspectives showing stays used for securing the fenders on the vehicles;

Fig. 66, a perspective showing the novel spring clip for securing the fender to the fork on the small and large tricycle and bicycle;

Fig. 67, a fragmentary view partly in section showing the front wheel and axle mounting on the large scooter;

Fig. 68, a fragmentary view partly in section showing the resilient mounting for the front of the foot board on the large scooter;

Fig. 69, a detail elevational view of one of the springs used in the foot board mounting;

Fig. 70, a fragmentary view partly in section showing the rear pivotal mounting for the foot board of the large scooter;

Fig. 71, a fragmentary top plan view partly in section showing the rear wheel and axle mounting together with the brake, stand and rear mudguard support for the large scooter;

Fig. 72, a fragmentary elevational view showing the stand in operative position supporting the scooter;

Fig. 73, a view similar to Fig. 72 showing the stand in inoperative position.

As already pointed out, the basic kit which has been disclosed in Fig. 1 of the drawings is only illustrative and can in no manner be considered limitive, since the kit may contain all or, if desired, only a relatively small selection of the parts contemplated by this invention. For purposes of convenience, consideration being given to the limitations of space as well as to the necessity for making a readily discernible disclosure, the kit portrayed in this figure of the drawings includes only the parts required for the selective assembly of the small and large tricycle, the small and large kiddie car, the bicycle, and the small and large scooter illustrated in Figs. 2, 3, 4, 5, 6, 7 and 8 respectively. Each part is separately displayed; the six sizes of wheels required have been superimposed to conserve space. A partitioned receptacle has been included, indicated at B, to house the miscellaneous fastening elements such as nuts, bolts, screws, etc. (not shown), mostly of conventional manufacture and standard size, required to complete any assembly.

To permit of an accurate concept of the sizes of vehicles contemplated herein, it may be noted that the parts appearing in the kit disclosed in Fig. 1 have been illustrated in a scale of one-quarter inch to the inch. However, the size of the separate parts has no bearing on the invention and is only of importance when consideration is given to the fact that certain of the selective vehicles contemplated herein are intended for use by children of tender years and small stature.

Each of the several vehicles which may be selectively assembled from the basic kit illustrated requires steering mechanism, and to this end a plurality of parts has been provided capable of ready assembly to form a competent steering member in novel fork form for the convenient reception therein of a single front wheel. Various forms of handles or handlebars are also provided, with novel means for attachment to the steering fork, to suit the special characteristics of the specific vehicle selectively under construction. Other means, or selectively interchangeable parts, are provided to vary the length of the steering fork and/or change the height of handle or handlebars thereabove, all as may be required appropriately to fit the type of vehicle under construction as well as the size of the individual for whom it may be intended.

The steering fork shown in Figs. 9 and 11 comprises a pair of right and left hand side members 1 and 2, preferably curved forwardly at their lower extremities as indicated respectively at 1a and 2a. Each of these side members is formed to provide a plurality of offset parallel surfaces disposed in stepped relationship, whereby the distance between the lower extremities will be substantially greater than that between the upper extremities when these members are assembled to form the steering fork so that a wheel may be accommodated therein.

The detailed construction of the members 1 and 2 is more particularly disclosed in Figs. 9 through 12 of the drawings. It will be observed that these members are provided with apertures 1b and 2b, respectively, adjacent the upper extremities thereof for the passage of suitable fastening members, such as bolts or the like 3b, intended for engagement within threaded bores 3a provided in the extremities of a substantially cylindrical head member 3 (see Fig. 13). The head 3 functions as a spacing member at the top of the steering fork and is provided with a centrally located and vertically disposed bore 3c, intended to permit the passage therethrough of a fork rod 4, and is cut away or otherwise provided with a flattened bottom surface indicated at 3d, for a purpose to be hereinafter more fully described.

The members 1 and 2 are also provided with apertures 1c and 2c, respectively, adjacent the lower extremities thereof, intended for the passage therethrough of a front axle, and these side members are further provided with a plurality of spaced and aligned apertures 1d and 2d, respectively, adapted to receive therein cylindrical studs formed on the extremities of suitable spacing elements or cross bars. Three pairs of apertures 1d and 2d have been provided and three cross bars have been illustrated (Figs. 15, 16 and 17), indicated at 5, 6 and 7 with opposed studs 5a, 6a, and 7a, respectively. These cross bars are intended for selective or composite use, as will be made more fully apparent hereinafter, in accordance with the specific assembly required for the particular vehicle under construction. The cross bars are further provided with centrally located apertures 5b, 6b and 7b, respectively, intended to permit the passage therethrough of the fork rod 4.

This fork rod is provided with an arcuate notch 4a adjacent the upper extremity thereof and is threaded adjacent the lower extremity, as indicated at 4b, for engagement with a suitable locking nut 4c, a reduced and threaded lower extremity 4d (see Fig. 14) being provided on the rod for a purpose to be hereinafter more fully described.

A handlebar member 8 is provided, of any desired ornamental configuration, with extremities 8a intended to have appropriate grips 8b mounted thereon. This handlebar includes a central substantially straight portion 8c provided with an arcuate notch 8d offset from the center thereof, and a preferably cylindrical coupling member 8e is rotatably and slidably mounted upon the portion 8c of the handlebar (see Figs. 18 and 19 of the drawings). As illustrated, the coupling 8e is provided with an offset longitudinal bore 8f through which the handlebar 8 passes, a snug fit being provided, and is further provided with a transversely disposed, offset and centrally located bore 8g adapted to receive the upper extremity of the fork rod 4 and spacing sleeve.

In assembling the handlebar and fork rod, the arcuate notch 8d of the handlebar is aligned with the bore 8g of the clamping member 8e, the arc of the notch being complementary to the surface of the bore, and the upper extremity of the fork rod 4 is inserted within the bore 8g, with the arcuate notch 4a facing the handlebar. A slight rotation of the handlebar, followed by lateral centering thereof within the coupling 8e, will displace the notch 8d, locking the upper extremity of the fork rod 4 within the coupling member 8e.

A spacing sleeve is provided to maintain the requisite distance between the handlebar 8 and the fork head member 3 and since this distance will vary in accordance with the selective vehicle, a plurality of such sleeves are provided, three being disclosed in the basic kit, indicated at 9, 10 and 10'. The upper extremity of each sleeve is notched, as indicated respectively at 9a, 10a and 10c, these notches being arcuate for snug engagement with the surface of the handlebar 8 within the bore 8g of the coupling 8e; the lower extremity of each sleeve is provided with an arcuate notch 9b, 10b and 10d, respectively, transversely disposed with respect to the notches 9a, 10a, and 10c (see Figs. 20 through 23), designed for snug engagement with the cylindrical periphery of the fork head member 3.

A complete assembly of steering fork and handlebar is illustrated in Fig. 24 of the drawings, the shorter spacing sleeve 9 being disclosed therein. It will be apparent, from an examination of this figure and Fig. 25, that after the steering fork rod and handlebar have been assembled, the spacing sleeve is positioned upon the fork rod which is then passed through the vertical bore 3c of the fork head 3 and the central apertures 5b and 6b of the cross bars 5 and 6. Tightening of the nut 4c upon the threaded portion 4b of the fork rod 4 will lock the assembly together, the engagement of the notched extremities of the spacing sleeve 9 with the handlebar 8 and fork head 3 effectively preventing any pivotal movement or rotative displacement between handlebar and steering fork.

A suitable swivel-type bracket 11 is mounted upon the fork rod 4, either between a pair of cross bars or between the uppermost cross bar and the flattened undersurface of the fork head 3, dependent upon the selective vehicle being assembled, and the front end of the frame or chassis of the vehicle is suspended from this bracket.

Preferably the bracket 11 shown in detail in Fig. 26 comprises a tubular hub portion 11a provided with a pair of angularly disposed diverging arms 11b and 11c. To eliminate or reduce possibility of wear, as between fork rod and bracket, a sleeve-like-bushing 11d is provided and the interior diameter of the hub portion 11a is such that this bushing fits snugly therein. The fork rod 4 is journalled within this bushing and the steering fork is thus suspended from the swivel bracket; free rotation or pivotal movement of the fork in either direction is thereby provided, to meet the requirements of the specific vehicle.

The arms 11b and 11c are provided with a plurality of aligned apertures 11e, 11f, and 11g intended to receive bolts or other fastening means whereby the frame or chassis of the vehicle may be secured to the swivel bracket. It will be obvious that at least one such bolt, or the like, would have to be angular, or bent, as indicated at 11h, by reason of the diverging disposition of the bracket arms 11b and 11c. While these arms may be of any desired size, preferably one horizontal edge of each is straight while the opposite edge is first curved and then angularly disposed, as indicated at 11i, thereby eliminating an abrupt corner which might result in injury to the person or damage to clothing.

The chassis comprises a pair of right and left hand frame members 12 and 13 shown in Figs. 27–30, bent intermediate the extremities thereof, as indicated at 12a and 13a, respectively, to provide substantially shorter angularly disposed forward portions 12b and 13b. Preferably these frame members are formed from angle iron, or the like, and a short distance from the bends 12a and 13a the members are bent outwardly at 12f and 13f as best shown in Figs. 28 and 30. The extremities of the angularly disposed portions 12b and 13b are given a return angular inclination toward the longitudinal axis of the frame members and then have the angularly disposed walls thereof bent to overlying relationship as indicated at 12c and 13c respectively.

Spaced apertures 12d and 12e are provided in the extremity 12c and spaced apertures 13d and 13e are provided in the extremity 13c, adapted for alignment with the similarly spaced apertures 11e and 11f and 11g in the arms of the swivel bracket 11, and the frame members are secured to this bracket by means of the angular bolt 11h and two conventional bolts.

The frame members 12 and 13 are provided with rear axle receiving apertures 12e and 13e in the perpendicularly disposed walls thereof adjacent the extremities remote from the swivel bracket and both walls of these members are provided with a plurality of apertures 12f and 13f, respectively, for the attachment of seats or seat supporting members or brackets as will be hereinafter more fully described. These frame members are of an appropriate length to interchangeably function as a chassis for any of the larger size vehicles contemplated herein.

To provide for a smaller chassis, or for a larger one, a plurality of varying sizes of frame members of this general type may be provided. In the basic kit illustrated, two pairs of such frame members are included, the smaller size shown in Figs. 31 and 32 comprising angle iron members 14 and 15 bent angularly at 14a and 15a to provide forward portions 14b and 15b, which are provided with spaced apertures 14d and 15d adapted for the reception of bolts to permit attachment to the swivel bracket 11. Rear axle receiving apertures 14e and 15e, respectively, are provided in the perpendicularly disposed walls, and apertures 14f and 15f are provided in the horizontally disposed walls, for the securing or attaching of appropriate seats, seat supporting members, or brackets.

As shown in the basic kit of Fig. 1, six sizes of wheels are provided in order that a proper selection may be made to construct a vehicle of the required size or a vehicle having a particular desired clearance above the ground. The details of these wheels are illustrated in Figs. 43 to 48, the wheel 16 of Fig. 43 being a die casting providing a hub 16a, spokes 16b and a rim 16c. A resilient tire 16d is applied to the rim in a conventional manner. The hub 16a is provided with a threaded extension 16e and a ball 16f is disposed in a lateral aperture in the threaded extension. The operation of this ball in conjunction with a nut received on the threaded extension for rotatably securing the wheel on an axle will be more fully described in connection with an actual vehicle assembly.

Figs. 44 and 45 illustrate two sizes of disc wheels 17 and 18, respectively, which are of more or less conventional construction being formed of two discs spot welded or otherwise secured together and having resilient tires 17a and 18a applied to the rim. These wheels, however, depart from the conventional in the particular structure used to form a hub, this construction being illustrated in detail in Fig. 49 and comprising a tube in the nature of a bushing 17b which is disposed in a central hole passing through the discs, the bushing 17b being provided with a threaded portion 17c for the reception of a nut, there also being a ball 17d disposed in a lateral aperture 17e extending through the threaded portion of the bushing. The bushing 17b is fixed to one or both of the discs for rotation therewith. The opposite end of the bushing 17b is provided with a lateral slot 17f which provides keyways for locking the wheels against rotation on an axle as will be more fully described in connection with the wheel and axle assemblies.

Figs. 46, 47 and 48 show three sizes of wire spoked wheels 19, 20 and 21 provided with resilient tires 19a, 20a, and 21a. These wheels may be of more or less conventional construction being provided with a hub 19b, 20b, and 21b connected to the rim 19c, 20c, and 21c by wire spokes or the like 19d, 20d, and 21d. Means may be provided for properly tensioning the spokes as is common with this type of wheel. The hubs of these wheels are also provided with lateral slots 19e, 20e, and 21e forming key-ways for locking the wheels on axles as will be more fully described.

The small and large tricycle, small and large kiddie car and bicycle shown in Figs. 2 to 6 require cranks and pedals for propulsion, and since the majority of parts used in these assemblies are common to these vehicles, the crank and pedal assembly will now be described, this assembly being shown particularly in Fig. 37.

The crank and pedal assembly comprises an axle 22, crank arms 23, bearings 24, a bearing support extension 25, and pedals 26.

The axle 22 comprises a substantially cylindrical central portion 22a terminating at each end in a threaded nut receiving portion 22b, each extremity of the axle being provided with a tapered portion 22c on opposite sides of which are provided flats 22d, each extreme end of the axle being provided with threaded portions 22e of smaller diameter than threaded portions 22b. Adjacent one end of the cylindrical portion 22a there are provided diametrically opposed keys 22f which may be formed by upsetting the metal of the axle.

The crank arms 23 comprise a straight bar 23a rectangular in cross section, this bar being provided adjacent one end thereof with a threaded aperture 23b for the reception of the threaded shank or axle on a pedal. Intermediate the center of the bar 23a and the aperture 23b there is provided a tapered aperture 23c having flats 23d adapted to engage the flats 22d provided on the axles 22. Adjacent the opposite end of the bar 23a is a tapered aperture 23e extending from the opposite side of the bar from aperture 23c, the aperture 23e being provided with flats 23f for engagement with the flats 22d of the axles 22. It will thus be seen that by this structure there has been provided a crank arm which may be adjustably mounted on the vehicle axles in order to provide crank arms of two different lengths.

The bearings 24 and bearing support extensions 25 comprise a nut 24a shown in Fig. 56 and being provided with an inner bore 24b which forms an outer race for caged ball bearings 24c. The bearing support extension 25 comprises a flat bar 25a provided adjacent one end thereof with a threaded aperture 25b for receiving the threaded portion 25c of an inner bearing race 25d, this race being provided with a cone type bearing engaging surface 25e. The bar 25a is also provided with a threaded aperture 25f and a smaller plain aperture 25g for receiving a securing bolt such as 25h and a screw by means of which the bar 25a is secured to the fork or other desired portion of the vehicle.

The pedals 26 are provided with a tread or foot-engaging portion 26a of rubber, wood or other suitable material, this tread being provided with a longitudinal aperture receiving a bushing 26b and a pedal axle 26c having a head 26d, rotatably received in the bushing 26b, the tread 26a being secured on the axle 26c by a nut 26e received on the threaded portion 26f provided on the opposite end of the axle. Nut 26e is also utilized to lock the axle in position in a crank arm. The threaded portion 26f projecting beyond the nut 26e may be engaged in the threaded aperture 23b of the crank arm 23 in order to properly mount the pedal thereon. The ball bearing type pedal 26g is of conventional construction and the axle thereof is provided with a threaded extension 26h for reception in the threaded aperture 23b of the crank arm 23, where it is secured in position with a locknut.

Any of the disc or spoked wheels 17 to 21 may be mounted upon the axle 22 by merely engaging the axis within the bore in the hub of the wheel with the keys 22f engaging in the key-ways provided in the wheel hub as clearly shown in Fig. 37. As will be seen from an inspection of Fig. 37, the crank arms 23 are secured on the axle 22 against rotation with respect thereto by nuts 22g engaging the threaded portion 22e of the axle 22, and against rotation in relation thereto by the engagement of flats 22d and tapered portion 22c with the flattened and tapered aperture 23e in the crank arm 23.

In assembling the wheel, axle, crank and pedal structure shown in Fig. 37, the desired wheel is selected, the proper size axle 22 is inserted in the hub thereof with the keys 22f engaging in the key-ways provided in the wheel hub, and the inner bearing races 25d (mounted in the bearing support extensions 25) are applied over the axle, one on each side of the wheel. The caged ball bearings 24c are then disposed on each inner bearing race and the nuts 24a forming the outer bearing race are threaded onto the threaded portion 22b of the axle 22. The nuts 24a are advanced until they tightly engage the bearings 24c whereupon the crank arms 23 are applied to the tapered portion 22c of the axle 22 and clamped firmly in position thereon by the nuts 22g. After application of the crank arms 23 the bearing race nuts 24a are backed off slightly until they tightly engage the inner surface of the crank arms 23, whereupon they are locked in position and the bearings are free to rotate within the same. The desired pedals 26a or 26g are then threaded into the threaded apertures 23b in the crank arms 23 to complete the assembly.

This complete assembly is then applied to the vehicle by securing the bearing support extensions 25 to the fork members 1 and 2 by means of the bolts 25h engaging threaded aperture 25f and any other desired fastening means engaging the apertures 25g. It will thus be seen that there has been provided a crank and pedal assembly which may be easily and conveniently assembled from the parts supplied and which affords a degree of adjustment as to the length of the crank arms and which may be easily applied to any of the vehicles on which such an assembly is required. It should be noted that the crank arms 23 may be conveniently removed from the tapered axle by backing off the outer bearing rod 24a to break the tapered joint. The rear axle of the small and large tricycle and the small and large kiddie car is secured to the frame or chassis in a novel manner which is equally applicable whether the large axle 27 shown in Fig. 33 or the smaller axle 28 shown in Fig. 34 is utilized.

The frame or chassis members 12 and 13 are provided with rear axle receiving apertures 12e and 13e and, as shown in Fig. 35, the frame members are applied to the axle and locked with relation thereto by oppositely disposed shoulders 27a and 27b. The diametrically opposed portions of the axle 27c and 27d adjacent these shoulders are reduced in order that the side portions of the frame members adjacent the aperture 12e may engage these shoulders. It should be noted, however, that the axis of the reduced portion is disposed at an angle to the axis of the axle and that the diameter of the reduced portion perpendicular to its axis is substantially equal to the diameter of the axle.

In assembling the frame members with the rear axle 27 the axle is passed through the apertures 12e with the frame members substantially perpendicular to the axle. It will be noted that shoulders 27a and 27b are provided adjacent each end of the axle and the aperture 12e in one frame member 12 is positioned in engagement with one pair of shoulders while the other aperture 13e in frame member 13 is positioned in engagement with the other pair of shoulders. Upon reaching the proper location on the axle with the inner surfaces of the apertures 12e and 13e engaging the reduced portions 27c of the axle 27 the opposite ends of the frame members 12 and 13 are moved toward each other, causing the rear ends of the frame members to pivot on the axle and to assume a position as shown in Fig. 35 with the opposed surfaces of the frame members 12 and 13 engaging the shoulders 27a and 27b. Since these shoulders are so proportioned and located as to require that the frame members be put under some slight tension when brought toward each other for proper assembly in the vehicles, it will be seen that this tension causes a tight locking engagement between the frame members and the rear axle and results in a secure and firm joint therebetween. In this manner relative rotation or sliding movement of the axle with respect to the frame members is prevented. There is thus provided a simple and effective joint which may be economically constructed and which may be utilized in assembling the vehicles in a minimum of time. Obviously the same principle may be utilized with a non-circular axle provided the aperture in the frame member is of the same configuration as the axle cross section and has substantially the same dimensions perpendicular to its axis.

It will be noted from an inspection of Figs. 33 and 35 that the axle 27 is provided adjacent the ends thereof with arcuate grooves 27e which are utilized in securing the rear wheels of the vehicle thereon. Axle 28 shown in Fig. 34 is also provided with similar grooves as well as shoulders and reduced portions for securing the same to the frame members.

The rear wheels are secured to the axle by a novel and easily manipulated joint or coupling in which, referring to the disc wheels shown in Figs. 44 and 45, ball 17d positioned in the aperture 17e is engaged with the groove 27e in the axle 27 to rotatably mount the wheels 17 thereon. The ball 17d is held in engagement with the groove 27e by a domed hub nut 29 threadedly engaging the threaded portion 17c of the sleeve or bushing 17b thus preventing outward movement of the ball 17d in the aperture 17e and rotatably locking the wheel in position on the axle 27. It will be noted that the diameter of the ball 17d is greater than the wall thickness of the hub or bushing 17b adjacent the aperture 17e, whereby engagement of the ball with the inner surface of the nut 29 will result in the ball projecting inwardly beyond the inner surface of the shaft receiving bore in the wheel hub.

The small and large tricycle shown in Figs. 2 and 3 and the bicycle shown in Fig. 6 are provided with a saddle 30 of conventional construction as shown in detail in Figs. 50 and 51, the saddle being provided with a clamp 30a for engaging a saddle post 31 shown in detail in Fig. 55, this post being provided with a horizontally disposed portion 31a having a flat 31b provided thereon for engagement with the clamp 30a and a substantially vertical elongated portion 31c. The saddle 30 may thus be mounted on a vehicle and its position adjusted horizontally or vertically to suit the size of the occupant.

Secured to the substantially horizontal portions of the frame members 12 and 13 is a saddle support member 32, shown in detail in Figs. 53 and 54 comprising two opposed plate-like portions 32a and 32b secured together by rivets or other suitable fastening means 32c. Portions of these plates 32a and 32b are so formed as to provide a substantially cylindrical aperture 32d adapted to receive the portion 31c of the saddle post 31, the post being clamped therein in adjusted position by bolt 32e extending through projecting ears 32f and 32g adjacent the aperture 32d. Plates 32a and 32b are formed with portions 32h and 32i disposed at substantially right angles thereto, these portions being provided with apertures 32j for securing the saddle support member to the frame members 12 and 13 of the vehicle. The manner of application of the saddle support member to the vehicles may be clearly seen in Figs. 2 and 3 and provides a convenient and adjustable saddle mounting.

The small and large tricycles shown in Figs. 2 and 3 are provided with a rear step 33 shown in detail in Fig. 57, comprising a substantially flat horizontal foot engaging portion 33a and having downwardly extending longitudinal flanges 33b to impart the necessary strength and rigidity thereto. The step 33 terminates at its ends in upturned flanges 33c provided with apertures 33d for securing the step to the vehicle. A pair of apertures 33e is also provided in the foot engaging portion 33a for receiving bolts designed to secure a clip 34 shown in Fig. 58 to the rear axle 27, thus securely fastening the step in place. The clip 34 is provided with a U-shaped portion 34a for engaging the axle and also has apertures 34b in ears 34c for reception of the securing bolts. As will be seen from an inspection of Figs. 2 and 3, the step 33 is secured to the vehicle by the clip 34 and by screw threaded fasteners or the like 35 extending through the appropriate apertures 33d and engaging the frame members 12 and 13.

In order to complete the small and large size tricycle, an appropriate sized front fender or mudguard 36 or 45 is provided which is shown in detail in Figs. 60 and 61, the manner of application of the fender being best shown in Figs. 2, 3 and 36. The fender 36 is provided adjacent the rear end thereof with apertures 36a for receiving screw threaded fasteners or the like 36b which secure a brace or stay 37 to the fender, the brace 37 being generally U-shaped as shown in Fig. 64 and being provided with apertures 37a for securing the same to the fork members 1 and 2. A like structure is also provided in fender 45.

The forward portion of the fender 36 is secured to the tricycle in a novel manner as shown in Fig. 36 and for this purpose is provided with an aperture 36c for disposition over the reduced extension 4d of the fork rod 4. In order to securely hold the fender in engagement with the reduced extension 4d, a novel spring clip member 38 shown in detail in Fig. 66 is provided, this clip member being generally U-shaped and having oppositely extending ends 38a and a looped central portion 38b providing an aperture for reception of the reduced extension 4d. As shown in Fig. 36 the reduced extension 4d is received within the aperture in the clip 38, the ends 38a being received in apertures 1d and 2d in the fork members 1 and 2, thus securely holding the fender in place but permitting quick removal thereof in case it is desired to dismantle the vehicle.

The small and large kiddie cars illustrated in Figs. 4 and 5 are constructed in a manner somewhat similar to the small and large tricycles above described, with the exception that the saddle is replaced by a board type seat and the curved handle bar is replaced by two straight handle bars replacing fork head fastening means 3b. Also, the smaller frame members 14 and 15 shown in Figs. 31 and 32 are substituted for the frame members 12 and 13. Likewise appropriate sized wheels are utilized in order to accommodate the kiddie car to the intended user.

In assembling the steering fork structure for use in the kiddie cars the fork rod 4 is replaced by a headed fork rod 39. This fork rod is essentially a bolt provided with a nut 39a and serves to secure the bracket 11 to the cross members 6 and 7 disposed between the fork side bar members 1 and 2.

The curved handle bar 8 and coupling member 8e is replaced by two straight handle bars 40, these handle bars being provided with a threaded portion 40a for reception in the threaded apertures 3a of the fork head 3, a nut 40b being provided on the bar 40 for locking the same in position on the fork. The bar 40 may also be provided with suitable hand grip 40c.

The seat of the small and large kiddie cars comprises a board 41 of oval configuration shown in detail in Fig. 52, this board being provided with a plurality of apertures 41a to adapt the same for use on different vehicles. The manner of attaching the seat board to the small and large kiddie cars is best shown in Figs. 4, 5, 38 and 39, the board 41 being secured at its narrow or forward end to the substantially horizontal portion of the frame members 14 and 15 by means of a seat support plate 42 provided with bent threaded fastening elements 42a threadedly engaged with the plate 42 adjacent the ends thereof. As shown in Fig. 39, the straight portions of the threaded fastening members 42a are disposed in the forward apertures 41a of the seat 41 and are securely clamped thereto by nuts 42b engaging the upwardly projecting ends of the screw threaded members. The plate 42 rests on the frame members 14 and 15 and the lower bent portions of the threaded members 42a project downwardly through apertures in the frame members and are rigidly clamped thereto by nuts 42c. This results in securely clamping the seat 41 in substantially horizontal position even though the frame members 14 and 15 are slightly inclined rearwardly.

The rear end of the seat 41 is supported by a U-shaped bracket 43 provided with apertures 43a for receiving screw threaded fastening members 43b extending through the board 41 to securely clamp the bracket thereto. The legs 43c of the bracket 43 are provided with apertures 43d for the reception of screw threaded fasteners 43e for tightly securing braces 44 thereto. These braces are of right and left hand configuration and are provided with apertures 44a at each end thereof for reception of the screw threaded fasteners 43e and fasteners 44b extending through the apertures in the opposite ends thereof to secure the brackets to the frame members 14 and 15 respectively.

The bicycle shown in Fig. 6 is constructed in a manner somewhat similar to the small and large tricycles except that of course one rear wheel is eliminated and the manner of mounting the single rear wheel is completely different from that utilized in connection with the tricycles. Also, in order to provide the proper disposition of the frame members 12 and 13 the swivel type bracket 11 which pivotally secures the frame members to the fork is inverted as clearly shown in Fig. 6, it being necessary when constructing the bicycle to remove the bushing 11d from the bracket 11 and insert the same from the opposite end in order that the flange thereon will properly engage the fork cross member 5 in order to provide a bearing surface between the cross member and the bracket. The fender 45 used on the large tricycle shown in Fig. 61 and its companion brace or stay 46 shown in Fig. 65 are also used on the bicycle. This larger fender is again secured in position by the spring clip 38 as shown in detail in Fig. 36 and described above in connection therewith.

The rear axle and wheel assembly for the bicycle comprises a relatively short axle 47 being provided with reduced threaded extremities 47a and an arcuate groove 47b which is not used in connection with the bicycle. The axle 47 rotatably engages a bushing 48 inserted within the wheel hub 49. The bushing 48 may be conveniently provided with a radial aperture 48a midway the length thereof which is designed to register with an aperture 49a in the hub 49 whereby the axle 47 and interior surface of the bushing 48 may be properly lubricated.

In assembling the rear wheel and axle assembly with the frame of the bicycle, right and left hand brake cam members 50 are utilized to convert the angle frame members 12 and 13 to rectangular members in order that the axle may be properly secured to the frame with the wheel positioned therebetween in substantially friction free relation. The cam members 50 are provided with apertures 50a of a size to be received over the reduced threaded extremities 47a of the axle 47, special nuts 47c being applied to these extremities to secure the wheel and axle assembly in position.

The frame of the bicycle is further strengthened by the use of a saddle support plate 51, this plate being of angular formation for incorporation between the frame members 12 and 13 at the bend between the forward and rear portions thereof. The support plate 51 is provided with suitable apertures 51a for the reception of threaded fasteners whereby the plate may be properly secured to the frame members. The frame of the bicycle is further reinforced by the use of a cross brace 52, this brace being provided with apertures 52a adjacent the ends thereof for the reception of screw threaded fastening means or the like 52b whereby the brace is securely fastened between the frame members 12 and 13 thus imparting sufficient rigidity to the frame and serving as the upper support for a rear fender.

It is also contemplated that the small and large scooter shown in Figs. 7 and 8 may be constructed from the parts included in the basic kit shown in Fig. 1, and while many of the parts incorporated in these vehicles are also utilized in constructing the vehicles above described, there are several differences in the basic method of construction which will now be set forth.

In constructing the small scooter of Fig. 7, a fork and handle bar assembly is constructed in substantially the same manner as described above, the appropriate fork rod and spacer tube being utilized to locate the handle bars at an appropriate height for the intended user. In this instance the swivel bracket 11 is positioned between the lowermost fork cross bar 6, which serves to position the frame members 12 and 13 attached thereto relatively close to the ground. It will be noted that the frame members 12 and 13 are attached to the swivel bracket 11 by curved bolt 11h and by two ordinary bolts, which engage the apertures 11e and 11g in the bracket 11 together with the appropriate holes in the ends of the frame members 12 and 13 rather than the apertures 11e and 11f as utilized in the previous vehicles.

The front wheel and axle assembly is shown in detail in Fig. 41 and utilizes a relatively short axle 53 comprising an intermediate cylindrical portion 53a in which there are disposed two arcuate grooves 53b and 53c, the axle 53 terminating at each end in reduced screw threaded portions 53d which may receive nuts for securing the axle in position. Referring to Fig. 41 it will be seen that one of the small die cast wheels 16 is positioned on the intermediate cylindrical portion 53a of the axle 53, the ball 16f positioned in a longitudinal aperture in the hub of the wheel 16 engaging groove 53b in the axle 53 to retain the wheel 16 thereon against sliding movement but permitting free rotation relative thereto. The ball 16f is held in engagement with the groove 53b by a nut 54 engaging a threaded portion of the hub of the wheel 16 and preventing outward movement of the ball 16f. It will be noted that the groove 53c of the axle 53 is not utilized in this assembly. The wheel and axle assembly is secured in position in the vehicle fork by engaging the reduced threaded extensions 53d with the apertures 1c and 2c in the side bars of the fork, the assembly being clamped in position by nuts 55 threadedly received on the extensions 53d.

It will be seen that the above described construction results in a relatively simple and easily assembled structure providing a rigid mounting for the wheel and yet permitting free rotation thereof upon the axle.

The rear wheel and axle assembly is also of relatively simple construction, the details of which are shown in Fig. 40 and utilizes an axle 56 provided adjacent the ends thereof with arcuate grooves 56a. The axle 56 is assembled with the frame members 12 and 13 by passing the same through apertures 12e and 13e located adjacent the rear ends thereof, the wheels 16 being spaced from the frame members 12 and 13 by spacer sleeves 57. Sleeves 57 are provided with a reduced extension 57a of a proper diameter to snugly engage within the apertures 12e and 13e of the frame members 12 and 13. As will be seen from an inspection of Fig. 40, this results in properly locating and securing the frame members 12 and 13 upon the axle 56. The wheels 16 are secured upon each end of the axle by engagement of the balls 16f with the grooves 56a, the balls being held in engagement therewith by nut 29 threadedly engaged with the hub of the wheel 16. Additional spacers 57b may be provided if it is desired to accommodate wheels having wider hubs.

The seat board utilized in the construction of the small and large kiddie car also forms the foot board for the small and large scooter. In the small scooter this foot board is secured to the frame members 12 and 13 with the wide end of the board facing forward, the manner of securing the same to the frame being shown in detail in Fig. 42. The foot board 41 is rigidly secured upon the frame 12 and 13 and serves to reinforce the same by utilizing cross bar 58. Cross bar 58 is similar to 52 with the exception of being slightly longer. Bar 58 is positioned adjacent the forward end of the foot board 41 and screw threaded fasteners 58a are passed through the appropriate holes in the forward portion of the foot board fasteners 58a being provided with nuts 58b engaging the bar 58 and nuts 58c engaging the lower flange of the frame members 12 and 13. The same structure is utilized at the rear of the foot board 41, the nuts 58b in this instance engaging the bar 52. This structure results in rigidly securing the foot board 41 to the frame members 12 and 13 and provides a reinforced structure having sufficient strength and rigidity to adequately support the weight which it is designed to carry.

It will be noted that the small scooter shown in Fig. 7 is of the three-wheel variety, which does not require balancing by the user and is intended for smaller children who have not as yet acquired the knack of balancing a two-wheel vehicle.

The large scooter shown in Fig. 8 is of the two-wheel variety intended for larger children and incorporates a novel brake and stand structure as well as a resiliently mounted foot board intended to afford a more comfortable ride.

The front fork and frame are assembled in the same manner as described above in connection with the smaller scooter, the appropriate fork rod and spacing tube being utilized to accommodate the intended user. In this vehicle disc wheels 17 shown in Fig. 44 are utilized and the front wheel is assembled with the axle and fork as shown in Fig. 67. In this case, the groove 53c in the axle 53 is utilized to retain the wheel in position thereon by engagement of the ball 17d therewith, this ball being retained in position by nut 54 in a manner similar to that described in connection with the small scooter. Once again the axle is held in position on the fork by nuts 55 engaging the reduced threaded extensions 53d on the axle 53.

The large scooter is provided with a front fender 59 shown in detail in Fig. 59, this fender being held in position by a brace or stay 60 shown in detail in Fig. 63, the stay being secured to the fender 59 by screw threaded fasteners or the like 59a engaging apertures 59b in the fender and apertures 60a in the brace. The U-shaped brace is likewise provided with apertures 60b by means of which the brace is secured to the fork side bars 1 and 2 by screw threaded fasteners or the like 60c. The forward end of the fender 59 is secured in position by engagement of the threaded extension 4d of the fork rod with an aperture in the crown of the fender and a nut applied to the extension 4d securely clamps the fender in position.

The rear wheel, axle, fender, stand and brake assembly provides a novel structure affording all of the functions of these elements and one which may be easily and quickly incorporated into the scooter structure. This assembly is shown in detail in Figs. 71 to 73 and utilizes one of the disc wheels 17 rotatably mounted upon axle 47 by engagement of the wall 17d with groove 47b, the ball being held against outward movement by nut 54. The wheel and axle is secured to the frame members 12 and 13 by engagement of the threaded extensions 47a with the apertures 12e and 13e in the frame members 12 and 13, the assembly being clamped together by special nuts 47c applied to the threaded extensions 47a.

The stand 61 comprises a generally U-shaped member having substantially parallel leg portions 61a terminating in diverging leg portions 61b. The diverging leg portions are joined adjacent the ends thereof by a connecting brace 62 secured to the leg 61b by a screw threaded fastener 62a on one side and a rivet on the other. The brace 62 is provided with a central aperture 62b and the closed end of the stand is provided with an aperture 61c. These two apertures serve as securing means for a rear fender 63 which may be secured in position by screw threaded fasteners 63a or other suitable means.

The parallel side portions 61a of the stand 61 are provided adjacent the ends thereof with apertures 61d of a size to fit over the axle 47 thus providing a means for rotatably mounting the stand 61 on the axle 47. Secured to the inner surface of each leg of the stand and concentric with the apertures 61d are a pair of brake shoes 64 which may conveniently comprise a metal disc 64a to the inner face of which is applied a disc 64b of leather or other suitable brake lining material. The brake shoes 64 are secured to the legs of the stand by screw threaded fasteners or the like 64c. Slightly forward of the brake shoes 64 a rivet or the like 65 is secured in each leg 61a of the stand 61, the domed heads 65a of the rivets 65 projecting outwardly from the outer surfaces of the leg 61a and serving a function which will be presently described.

The stand 61, as will be seen from an inspection of Fig. 71, is assembled on the scooter with the legs 61a thereof positioned between the side faces of the wheel 17 and the inner edges of the frame members 12 and 13. Also positioned within the inner angles of the frame members 12 and 13 are brake cam members 50, the apertures 50a of these cam members engaging over the screw threaded extensions 47a of the axle 47, the cam members 50 being provided with vertically extending cam surfaces 50b which as shown in Fig. 71 are positioned opposite each other.

In Fig. 71 the brake is shown in inoperative position. In order to apply the same, the rider presses his heel or other portion of his foot on an angular extension 61e provided on the forward end of the stand 61 to force the same downwardly, at which time the projecting heads 65a of the rivets 65 will engage the cam surfaces 50b of the cam blocks 50, thus forcing the legs 61a of the stand 61 inwardly and engaging the inner surface of the brake shoes 64 with the outer surfaces of the wheel discs, thereby exerting a braking force thereon to retard the motion of the vehicle. Upon release of foot pressure upon the member 61e, the brake shoes 64 will return to inoperative position due to the resiliency of the stand 61. The stand is retained in this position by overhanging lips 50c on the cam blocks 50 which engage the heads 65a of the rivets 65, it being necessary to exert an appreciable force on the stand in order to move the rivet heads 65a by the lips 50c and the stand to vehicle supporting position. This assembly provides an extremely simple, easily operable and efficient brake structure.

The stand 61 accomplishes its function of supporting the vehicle when at rest as shown in Fig. 72 by being rotated about the axle 47 until the ends of the diverging legs 61b are slightly forward of the center line of axle 47, at which time limit stop 66 secured to one leg of the stand by screw threaded fastener 64c will engage the frame member 12 and prevent further rotary movement of the stand, thus supporting the scooter in vertical position when at rest. As will be seen from an inspection of Fig. 72, the fender 63 moves with the stand 61 but is always in position to protect the rider of the vehicle when the same is in motion as shown in Fig. 73.

The foot board 41 is applied to the large scooter in such manner that the same will be resiliently supported and thus afford a more comfortable ride for the occupant of the vehicle. The details of this construction are shown in Figs. 68 and 70. In order to provide for this resilient support of the foot board 41, the rear end thereof is pivotally mounted on the frame members 12 and 13 as shown in Fig. 70 by securing to the foot board by means of screw threaded fasteners or the like 67 passing therethrough the U-shaped bracket 43, the apertures 43d being adapted to receive an elongated bolt 68 projecting through apertures in the frame members 12 and 13, thus pivotally mounting the rear end of the foot board 41 on the frame. The frame is also reinforced at this point by a laterally extending cross bar 52 secured to the frame members 12 and 13 by screw threaded fasteners or the like 69.

The forward end of the foot board is resiliently supported on the frame as shown in Fig. 68 by coil springs 70 shown in detail in Fig. 69. In order to limit upward movement of the foot board 41 under the action of springs 70 and to properly hold the springs in position, a generally U-shaped bracket 71 with inwardly extending ends is secured to the forward end of the foot board by screw threaded fasteners or the like 72 passing through the foot board and apertures 71a in the bracket 71. The lower ends of fastening members 72 project below the securing nuts 72a and extend inside of the convolutions of coil springs 70, thus preventing undesirable movement of the upper ends of these springs away from a point directly below the fasteners 72. In order to reinforce the frame at this point a cross brace 58 is secured to the frame members 12 and 13 by screw threaded fasteners 73 projecting upwardly therethrough, the upper ends of these fasteners extending above the securing nuts 73a and within the convolutions of the lower ends of springs 70, thus retaining the springs in their proper locations.

It will thus be seen that when assembled in proper relationship the foot board 41 will normally be held in elevated position by springs 70 which will be depressed by the weight of the vehicle occupant and will afford a resilient support therefor. The upward movement of the foot board 41 when unoccupied is limited by contact of the inwardly extending ends 71b of the bracket 71 with the heads of the bolts 73.

The structure above described results in the provision of a sturdy, easily assembled scooter of adequate size to support a child normally using this type of vehicle and in addition is provided with a novel and efficient brake mechanism affording full control of the vehicle at all times.

There have now been described the structures of seven different vehicles and the component parts thereof, all of which parts are included in the illustrative basic kit depicted in Fig. 1. While these vehicles are of course separate assemblies, nevertheless in the exposition given above they have in effect been treated as part of the illustrative basic kit. In consequence, and because of the extensive interchangeability of parts, the description has not been sharply divided as to each vehicle, but has been given in the form of a general explanation with more specific references to the particular aspects of the assembly of each separate vehicle.

The vehicles described above are completely practical both from the standpoint of strength and range of sizes, being intended to accommodate children whose age and size varies to a relatively large degree. It will also be apparent that this invention makes a very real contribution to the educational developement of the child, in that it affords the opportunity for a study of structural details as well as experience in the proper use of tools in assembling the various parts. The reward for this study and mechanical practice is the provision of a vehicle or vehicles from the use of which great pleasure may be obtained. It will be noted that in all cases the structures provided are capable of active use by the child after they have been assembled, in which respect they differ markedly from many of the articles made from so-called contructional kits of the more orthodox type.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A steering fork comprising right and left side members having lateral offsets providing a plurality of stepped portions, an aperture in each portion, fork cross members of graduated size corresponding to the distance between said side members at each portion, each of said cross members having a reduced extension at each end thereof receivable in said apertures and a substantially central fork rod receiving aperture, a fork head comprising a substantially cylindrical member having a screw threaded aperture in each end thereof and a diametrically disposed fork rod receiving aperture, fastener receiving apertures adjacent the upper ends of said side members and fastening means extending through said last mentioned apertures and threadedly engaged with said threaded apertures in said fork head whereby the parts of said fork are maintained in assembled relationship.

2. A steering fork as defined in claim 1 in which a fork rod is disposed in said fork rod receiving apertures and a chassis connecting swivel bracket is pivotally mounted on said fork rod between two of said fork cross members.

3. A steering fork as defined in claim 1 in which said fork rod is secured in position by a nut threadedly received on the lower end thereof and engaging the lower surface of the lower fork cross member.

4. A steering fork as defined in claim 1 in which the number of fork cross members utilized may be varied in accordance with the diameter of the wheel to be accommodated between the side members of said fork.

5. A wheeled vehicle comprising a chassis, a rear wheel assembly secured to said chassis, occupant carrying means secured to said chassis, a steerable front fork assembly pivotally mounted on said chassis, said fork assembly comprising right and left side members having lateral offsets providing a plurality of stepped portions, an aperture in each portion, fork cross members of graduated sizes corresponding to the distance between said side members at each portion, each of said cross members having a reduced extension at each end thereof receivable in said apertures and a substantially central fork rod receiving aperture, a fork head comprising a substantially cylindrical member having a screw threaded aperture in each end thereof and a diametrically disposed fork rod receiving aperture, fastener receiving apertures adjacent the upper ends of said side members, fastening means extending through said last mentioned apertures and threadedly engaged with said threaded apertures in said fork head, a fork rod extending through said fork rod receiving apertures, a nut threadedly engaged with the lower end of said fork rod and engaging the lower surface of the lower fork cross member and a handle bar assembly secured to the upper end of said fork rod, a crank axle and wheel assembly rotatably mounted on the lower end of said fork assembly, said fork assembly being usable in different vehicles of varying sizes by varying the number of fork cross bars and by varying the length of said fork rod whereby the effective height of said fork assembly may be varied in accordance with the size of the occupant or the type of vehicle.

6. A wheeled vehicle comprising a chassis, a rear wheel assembly secured to said chassis, occupant carrying means secured to said chassis, a steerable front fork assembly pivotally mounted on said chassis, said fork assembly comprising right and left side members having lateral offsets providing a plurality of stepped portions, an aperture in each portion, a fork cross member selectively positioned between said side members at one of said stepped portions, a reduced extension at each end of said cross member disposed in certain of said apertures, a substantially central fork rod receiving aperture in said cross member, a fork head comprising a substantially cylindrical member disposed between said side members adjacent the upper end thereof, means for securing said fork head to said side members, a fork rod received in the aperture in said cross member and engaging said chassis, a handle bar assembly secured to said front fork assembly, a crank axle and wheel assembly rotatably mounted on the lower end of said front fork assembly said front fork assembly being usable in different vehicles of varying sizes by locating said cross member at different selected positions between said side members.

7. A wheeled vehicle comprising a chassis, a rear wheel assembly secured to said chassis, occupant carrying means secured to said chassis, a steerable front fork assembly pivotally mounted on said chassis, said fork assembly comprising right and left side members having lateral offsets providing a plurality of stepped portions, a fork cross member selectively positioned between said side members at one of said stepped portions, a substantially central fork rod receiving aperture in said cross member, a fork head comprising a substantially cylindrical member disposed between said side members adjacent the upper end thereof, means for securing said fork head to said side members, a fork rod received in the aperture in said cross member and engaging said chassis, a handle bar assembly secured to said front fork assembly, a crank axle and wheel assembly rotatably mounted on the lower end of said front fork assembly said front fork assembly being usable in different vehicles of varying sizes by locating said cross member at different selected positions between said side members.

8. A wheeled vehicle comprising a chassis, a rear wheel assembly secured to said chassis, occupant carrying means secured to said chassis, a steerable front fork assembly pivotally mounted on said chassis, said fork assembly comprising right and left side members having lateral offsets providing a plurality of stepped portions, a fork cross member selectively positioned between said side members at one of said stepped portions, a substantially central fork rod receiving aperture in said cross member, a fork head member disposed between said side members adjacent the upper end thereof, means for securing said fork head to said side members, a fork rod received in the aperture in said cross member and engaging said chassis, a handle bar assembly secured to said front fork assembly, a crank axle and wheel assembly rotatably mounted on the lower end of said front fork assembly said fork assembly being usable in different vehicles of varying sizes by locating said cross member at different selected positions between said side members.

9. A wheeled vehicle comprising a chassis, a rear wheel assembly secured to said chassis, occupant carrying means secured to said chassis, a steerable front fork assembly pivotally mounted on said chassis, said fork assembly comprising right and left side members, a fork cross member positioned between said side members, a substantially central fork rod receiving aperture in said cross member, a fork head member disposed between said side members adjacent the upper end thereof, means for securing said fork head to said side members, a fork rod received in the aperture in said cross member and engaging said chassis, a handle bar assembly secured to said front fork assembly, a crank axle and wheel assembly rotatably mounted on the lower end of said front fork assembly said front fork assembly being usable in different vehicles of varying sizes by locating said cross member at different selected positions between said side members.

References Cited in the file of this patent

UNITED STATES PATENTS

| Number | Name | Date |
|---|---|---|
| 359,000 | Anderson | Mar. 8, 1887 |
| 541,762 | Klinck | June 25, 1895 |
| 566,478 | Seaman | Aug. 25, 1896 |
| 625,873 | Cressman | May 30, 1899 |
| 681,569 | McNamara | Aug. 27, 1901 |
| 779,606 | Keyes | Jan. 10, 1905 |
| 823,712 | Uhlmann | June 19, 1906 |
| 950,197 | Walters | Feb. 22, 1910 |
| 1,192,688 | Sargent | July 25, 1916 |
| 1,216,195 | Williamson | Feb. 13, 1917 |
| 1,225,637 | Jenkins | May 8, 1917 |
| 1,288,956 | Miller | Dec. 24, 1918 |
| 1,395,660 | Allen | Nov. 1, 1921 |
| 1,457,972 | Gilbert | June 5, 1923 |
| 1,467,271 | Gutekunst | Sept. 4, 1923 |
| 1,481,704 | Gilbert | Jan. 22, 1924 |
| 1,490,534 | McCauley | Apr. 15, 1924 |
| 1,553,239 | Hauser | Sept. 8, 1925 |
| 1,571,013 | Ledig | Jan. 26, 1926 |
| 1,647,047 | Kennedy | Oct. 25, 1927 |
| 1,666,104 | McMurtrie | Apr. 17, 1928 |
| 1,689,682 | Rainey | Oct. 30, 1928 |
| 1,761,679 | Quickert | June 3, 1930 |
| 1,804,927 | Gilbert | May 12, 1931 |
| 1,890,755 | Shepherd | Dec. 13, 1932 |
| 1,893,721 | Wahlberg | Jan. 10, 1933 |
| 1,908,008 | Bethenod et al. | May 9, 1933 |
| 1,984,309 | Klatt | Dec. 11, 1934 |
| 2,011,714 | Friedman | Aug. 20, 1935 |
| 2,057,872 | Anderson | Oct. 20, 1936 |
| 2,135,257 | Manton | Nov. 1, 1938 |
| 2,160,035 | Schwinn | May 30, 1939 |
| 2,167,020 | Anderson | July 25, 1939 |
| 2,200,177 | Klavik | May 7, 1940 |

(Other references on following page)